3,136,662
POWDERED ORGANIC PRODUCTS AND METHOD OF MAKING SAME

Martin A. Baum, Schofield, and Richard F. Benning, Wausau, Wis., assignors to American Can Company, New York, N.Y., a corporation of New Jersey
No Drawing. Filed May 16, 1962, Ser. No. 195,328
8 Claims. (Cl. 127—40)

This invention relates to a method for reducing to an essentially dry, powdered state solutions of organic materials which had previously been considered extremely difficult to dry and to the products so produced. In a particular aspect, the invention relates to a method for obtaining a dry, powdered product from difficult-to-dry solutions of spent sulfite liquor solids, especially those solutions which contain substantial amounts of carbohydrate derivatives such as the wood sugars or wood sugar derivatives.

In a number of industrial processes, aqueous liquors are obtained from which it is very difficult to separate the dissolved solid components by simple crystallization or extraction techniques. In such cases, it is necessary to remove the solution medium by evaporation, generally by means of spray drying or drum drying techniques, to leave a dry, solid residue of the solute components. The ease with which such drying processes are accomplished varies greatly, depending on the physical and chemical character of the solid components, the complexity of the mixture of solids in the solution, and on a number of similar, related factors. In some instances the residues from the common evaporative processes have been of such a sticky, gummy, or mucilaginous character that their reduction to a dry state has been impractical from a material handling standpoint, and, as a matter of practical, economic necessity, the products have been packaged, stored, transported and merchandised in the form of aqueous solutions. Handling and shipping costs have often been undesirably high in such cases. Such materials may be described as being tenaciously amorphous in the sense that it is extremely difficult to recover them from their aqueous solutions as dry, finely divided solids by economically attractive evaporative processes.

Among the materials which fall in the above category are certain solutions obtained as a result of the sulfite process for the preparation of paper pulp from wood. The spent sulfite liquor from this process contains many valuable dissolved components leached from the wood in the course of separating the papermaking cellulose fiber, the soluble components including lignosulfonic acid salts, hemicelluloses and wood sugar derivatives, including salts of wood sugar acids. The components of the spent sulfite liquor have proven to be of value as adhesives, dispersants, tanning agents and as a raw material for the manufacture of vanillin and other synthetic materials.

Spent liquors from the sulfite process may be readily spray dried or drum dried to yield dry, pulverulent materials containing salts of the alkaline earth metals such as calcium and magnesium. For certain industrial uses, however, it is highly desirable to obtain the spent sulfite liquor solids, or the solids from certain fractions of spent sulfite liquor, in the form of salts of monovalent cations such as sodium, potassium or ammonium. The alkali metal salts and ammonium salts of spent sulfite liquor solids, and in particular those solids which are relatively rich in carbohydrate derivatives, are extremely difficult to obtain in the dry state by standard evaporative procedures since they tend to fuse and adhere to heated drying surfaces with which they come in contact, whereby they agglomerate into sticky, gummy masses of material when the aqueous solutions are subjected, for example, to either spray or drum drying.

Accordingly, it is an object of this invention to alter the drying characteristics of aqueous solutions of tenaciously amorphous materials in such a manner that the solids content of such solutions may be readily obtained as dry, finely divided, free-flowing, powdered material.

Furthermore, it is an object of this invention, in a particular aspect thereof, to provide a method whereby sodium, potassium and ammonium salts of spent sulfite liquor solids may be obtained from aqueous solutions thereof as dry, free-flowing, powdered solids.

It is a further object of this invention to modify the aqueous solutions of tenaciously amorphous solid materials such as the sodium, potassium and ammonium salts of sulfite liquor solids and other carbohydrate-containing liquors so that such solutions may be readily spray or drum dried, without adherence of the dried solids to the surfaces of the drying mechanism, to yield the solute materials in the form of non-agglomerated, dry, free-flowing, pulverulent solid particles.

Further objects and the advantages of the invention will become apparent from the following detailed description thereof.

We have found that the addition of small amounts of a water-soluble boron compound such as boric acid or a soluble borate salt to aqueous solutions of the sodium, potassium or ammonium salts of spent sulfite liquor solids or to aqueous solutions of other tenaciously amorphous materials effectively modifies the properties of such materials so that the resulting solutions may be readily reduced to free-flowing, dry, powdered solid materials by standard evaporative procedures at elevated temperature in conventional spray or drum drying equipment. The amount of boron compound required to achieve the desired drying characteristics varies from 1% to about 15% by weight of dissolved solids, depending primarily on the proportion of carbohydrate derivatives in the particular solution.

Example 1

Calcium base spent sulfite liquor obtained by the digestive cooking of a blend of hardwood and softwood was concentrated to a liquor containing 57% solids by weight and converted to an ammonium base by the addition of ammonium sulfate in an amount stoichiometrically equivalent to the calcium present. The precipitated inorganic solids, primarily calcium sulfate, were removed by filtration. The resulting ammonium base liquor, having 47% solids content, was fed at the rate of 80 lbs. of liquor per minute to a commercial spray drier. The inlet air temperature was 500° F. and the outlet air temperature was 235–240° F. Drying of the liquor was completely unsatisfactory since the dried solid particles fused, agglomerated, and adhered tightly to the walls of the spray chamber. Essentially no product was obtained at the bagging outlet of the dryer. After 15 minutes of operation, the dryer was shut down for inspection. The dried solids (approximately 500 lbs.) were removed from the chamber walls by a high pressure air hose. The product was a dark-colored, agglomerated, non-free-flowing mass of solid particles.

Example 2

To 15,000 lbs. of the 47% solids ammonia base liquor of Example 1, above, was added 400 lbs. (5.9% on a solids basis) of boric acid. After stirring to solution, the liquor was fed to the spray dryer at the rate of 100 lbs. of feed liquor per minute. The inlet air temperature was 500° F. and the outlet air temperature was 235–240° F. The dried product was obtained at the bagging outlet of the dryer as a finely divided, free-flowing, tan colored pulverulent solid material of particular value as a pelletizing adhesive. Seven thousand lbs. of dried material was obtained in two and one half hours. Inspection of the dryer chamber after shut-down showed it to be clean and completely free of solids adhering to the walls.

Example 3

Calcium base spent sulfite liquor obtained from a mixed hardwood-softwood cook was concentrated to a liquor containing 57% solids by weight and converted to a sodium base by the addition of sodium sulfate and sodium bisulfate in an amount stoichiometrically equivalent to the calcium present. The precipitated solids, primarily calcium sulfate, were removed by filtration. To 18,300 lbs. of the resulting sodium base liquor containing 46% solids was added 200 lbs. (2.4% solids basis) of boric acid. After stirring to dissolve the boric acid, the treated liquor was fed at the rate of 75 lbs. per minute to the spray dryer, the inlet air temperature being 500° F. and the outlet air temperature being 240° F. The product was obtained as a dry, free-flowing, tan-colored powder at the bagging outlet. After 40 minutes of operation, the dryer was shut down for inspection. The drying chamber walls were found to be clean except for one small area where some slight hang-up of product had occurred. On application of an air blast in this area, it was found that the dried product was free-flowing and not appreciably adhered to the wall. Upon being freed by the air blast, the powder was found to be free of lumps and not agglomerated.

At this point an additional 0.6% of boric acid (based on the solids content of the remaining liquor) was added and drying was resumed. After one hour of operation, a second shut-down for inspection showed the drying chamber to be almost completely free of hang-up of the dried product. Drying was again resumed, the total product recovery at the bagging outlet being approximately 8200 lbs. of free-flowing, tan-colored, finely divided powdered product suitable for use as a component of tanning liquors, as a pelletizing adhesive for ore products, and as a dispersing and sequestering agent in cooling water treatment.

Previous attempts to dry a sodium base liquor without the addition of boric acid had resulted in failure due to agglomeration and hang-up of the product in the drying chamber, with little or no powdered product being obtained at the bagging outlet of the dryer.

Results similar to those described above are obtained when a potassium base liquor is substituted for the sodium base liquor of Example 2. Similarly, sodium, potassium or ammonium borate in amounts ranging from 1% to about 10% by weight of liquor solids may be substituted for the boric acid utilized in the foregoing examples. In general, it is considered preferable to use either boric acid or the borate salt of the same metallic cation (the ammonium ion being the equivalent of a monovalent metallic cation in this usage) as that forming the base of the particular spent sulfite liquor under consideration. That is, boric acid and sodium borate are preferred for use with sodium base spent liquor, boric acid and potassium borate with potassium base liquor and boric acid and ammonium borate with ammonium base liquor. In each case, the various hydrate salts of both metaborates and tetraborates are to be considered equivalents, the weight calculations being based on the nonhydrated compound.

The process of this invention is of particular value in facilitating the drying of fractions of sulfite spent liquor which contain substantial amounts of wood sugar derivatives. Removal of a major portion of the lignosulfonates present in spent sulfite liquor by, for example, precipitation with lime according to the Howard process described in U.S. Reissued Patent 18,268, December 1, 1931, and in U.S. Patents No. 1,856,558, May 3, 1932, and 1,924,361 August 29, 1933, results in a filtrate liquor containing a high proportion of hemicelluloses and wood sugar derivatives. The Howard process filtrate liquor may be converted from a calcium base to an alkali metal or ammonium base by addition of the appropriate carbonate or sulfate salt and removal of the resulting precipitated calcium carbonate or sulfate. The solid content of the converted liquor, which contains a high proportion of the non-lignin components such as hemicellulose and wood sugar derivatives, is extremely difficult to obtain as a dry, free-flowing powder, due to its strong tendency to agglomerate and fuse into a sticky, adherent mass at a relatively low temperature. For this reason, this material has not hitherto been commercially obtainable in the dry state but has of necessity always been merchandised as an aqueous solution. The necessity for leak-free storage and shipping containers and the added shipping costs which this type of handling has entailed have constituted a serious economic disadvantage as well as an annoying inconvenience in the use of these materials in industry.

The addition of 5–10% of boric acid, alkali metal borate or ammonium borate (based on the sulfite liquor solids weight) to a sodium, potassium or ammonium base solution of the Howard process filtrate liquor dramatically alters the drying properties of the solution so that it may be readily spray or drum-dried on commercial equipment to yield a free-flowing, dry, powdered product which may be handled, stored and shipped in inexpensive, multiwall paper bags, with attendant savings in freight and in packaging and handling costs. The products are effective pelletizing agents, dispersants and tanning liquor components.

Example 4

Spent sulfite liquor obtained as a by-product from the manufacture of papermaking cellulose pulp from a blend of hardwood and softwood was treated with lime in the multi-stage manner of the Howard process and successive precipitates, comprising substantially calcium sulfite and basic calcium lignosulfonate, were removed by filtration. In addition to precipitating calcium sulfite and a major portion of the lignosulfonate present in the spent sulfite liquor, the Howard process lime treatment results in the conversion of a large part of the carbohydrate components of the liquor to calcium salts of the various sugar acids. About 60–70% of the solids present in the filtrate or tail liquor, after separation of the precipitated calcium sulfite and basic calcium lignosulfonates, is comprised of these carbohydrate derivatives, the remainder being lignosulfonates not removed by the lime treatment. The filtrate liquor from the Howard process was treated with carbon dioxide to precipitate the free lime as calcium carbonate and sufficient sodium carbonate was added to convert the calcium salts of the organic compounds present to sodium salts. After filtering to remove calcium carbonate, the clarified liquor was concentrated to a liquor containing 55% solids by weight.

Attempts to dry the concentrated sodium base liquor by spray or drum-drying techniques under a variety of operating conditions were unsuccessful, the dried product caking severely in the spray drying chamber and on the scraper blades of the drum dryer so that economical commercial production of the dried material was considered impossible of attainment.

Example 5

To 20,000 lbs. of concentrated sodium base liquor of Example 4, containing 55% by weight of spent sulfite liquor solids rich in carbohydrate derivatives, was added 1100 lbs. (10% based on solids content) of boric acid and the liquor was introduced into a spray drying unit at the rate of 80 lbs. of liquor a minute. The inlet air temperature was 500° F. and the outlet air temperature was 240–245° F. A total of 11,700 lbs. of dried product was obtained at the bagging outlet of the dryer as a dry, free-flowing, tan-colored powder in the course of 4½ hours of drying time. Inspection of the interior of the drying chamber showed no hold-up of agglomerated particles adhered to the walls of the chamber. The product is of particular value as a dispersant in industrial cleaners.

Similarly, drum drying of the sodium base concentrated liquor treated with 5–10% by weight of solids of boric acid or sodium borate may be accomplished without difficulty, the take-off scraper blades remaining free of agglomerated material and the product being obtained as a dry, easily-handled material, which readily disintegrates to a free-flowing powder.

The remarkable effectiveness of boric acid and the water-soluble borates in converting difficult-to-dry aqueous solutions of mucilaginous materials into liquors which may be readily reduced to free-flowing dry powders in conventional spray-drying or drum-drying equipment is not restricted to solutions of spent sulfite liquor solids or fractions thereof. A variety of solutions of tenaciously amorphous materials respond in like manner to the presence of small amounts of boric acid or its soluble salts. Materials which exhibit this response in the greatest degree are those containing, in substantial amounts, compounds bearing a hydroxyl group on each of at least two adjacent carbon atoms in the molecule. In general, as the proportion of carbohydrate materials or other polyhydroxy derivatives in the dissolved solute increases, it is desirable to increase the amount of added boron compound within the prescribed range of about 1% to 15% by weight of the solute.

Aqueous solutions containing mixtures of a large number of polyhydroxy compounds of varying molecular weight and configuration are more difficult to reduce to dryness because of the inhibition of crystallization caused by the complexity of the blend. The addition of boric acid or borates to solutions of complex mixtures of polyhydroxy compounds, which are otherwise difficult to reduce to a dry state, is particularly advantageous. Spent sulfite liquor, being a blend of innumerable compounds of varying constitution, many of which contain hydroxyl groups on adjacent carbon atoms, is an excellent example of this type of aqueous solution and has herein been utilized merely as exemplary of the broad category of solutions of materials which respond in like manner to the addition of boric acid or its salts. Molasses and corn syrup are additional examples of concentrated carbohydrate-containing solutions which, by virtue of the complexity of the blend of compounds contained therein, are difficult to reduce to a dry, free-flowing, finely-divided, particulate solid state. These materials respond to the addition of water soluble borates of monovalent cations in the manner previously described, as may be seen from the following example.

Example 6

Separate portions of commercial molasses containing about 80% solids were treated with 5%, 10% and 15% boric acid based on the molasses solids weight and the treated portions fed to a spray dryer at the rate of 30 lbs. per minute. The inlet air temperature was 300° F. and the outlet air temperature 200° F. Molasses treated with 5% boric acid dried to a yellow solid which showed slight tendency to adhere to the walls of the drying chamber. The resulting powdered material was substantially free-flowing although it exhibited some tendency to agglomerate into clumps of particles. The molasses treated with 10% boric acid dried to a yellow powder which showed very little tendency to agglomerate or adhere to the drying chamber walls. The 15% boric acid treated molasses dried to a completely free-flowing, bright yellow powder which showed no tendency to adhere to the drying chamber walls, the resulting product in each case being an effective pelletizing adhesive.

Although the mechanism by which boric acid and its salts of monovalent cations alter the drying characteristics of difficult-to-dry solutions of materials such as those previously discussed is not definitely established, it is believed that a molecular complex is formed which bonds the boron to the hydroxyl groups attached to each of two adjacent carbon atoms in the solute molecules. The resulting complex of the solute molecule with boron is sufficiently altered in its characteristics from those of the original solute to enable the complex to be readily spray dried or drum dried. In this connection it has been established that the dried ammonium based sulfite liquor product of Example 2, above, containing 5.9% boric acid, had a fusion temperature more than 150° F. higher than the corresponding control material of Example 1, which contained no boric acid. Similarly, the dried sodium based liquor solids from Example 3, containing 2.4% benzoic acid had a fusion temperature more than 150° F. higher than the corresponding sodium based liquor solids which did not contain a compound of boron. It is evident that the increase of more than 150° F. in fusion temperature resulting from the formation of a boron-containing complex has a profound influence on the drying characteristics of the solute material, presumably by reducing the tendency of the particles to fuse and cling to each other or to the heated dryer parts with which they come in contact.

While the present invention has been described and explained with reference to specific examples, it is not intended to be limited thereby, the scope of the invention being defined in the appended claims.

We claim:

1. A method for obtaining in a substantially water-free pulverulent state the solute components present in an aqueous solution of tenaciously amorphous solute material containing components that are reactive with a water soluble borate compound, which comprises dissolving in said aqueous solution between 1% and 15% based on said solute weight of a water-soluble borate compound having a monovalent cation and subsequently removing water from said solution by vaporization of said water at elevated temperature to produce substantially dry pulverulent solids from said solution.

2. A method for obtaining spent sulfite liquor solids in a substantially water-free pulverulent state from an aqueous solution containing such solids in the form of salts of a monovalent cation, comprising dissolving in said solution between 1% and 10% based on the weight of said solids of a water-soluble borate compound having a monovalent cation and subsequently removing the water from said solution by vaporization at elevated temperature to produce substantially dry pulverulent solids from said solution.

3. A method for obtaining in a substantially dry pulverulent state the solute components present in molasses which comprises adding to said molasses between 5% and 15% based on the weight of said solute components of a compound selected from the group consisting of boric acid, sodium borate, potassium borate and ammonium borate and then drying the mixture to produce substantially dry pulverulent solids from the mixture.

4. A method for obtaining in a substantially dry, pulverulent state the solute components present in corn syrup which comprises adding to said corn syrup between 5% and 15% based on the weight of said solute components of a compound selected from the group consisting of boric acid, sodium borate, potassium borate and ammonium borate and then drying the mixture to produce substantially dry pulverulent solids from the mixture.

5. A dry, free-flowing pulverulent solid product made in accordance with the method of claim 1.

6. A dry, free-flowing pulverulent solid product derived from spent sulfite liquor made in accordance with the method of claim 2.

7. A dry, free-flowing pulverulent solid product of molasses made in accordance with the method of claim 3.

8. A dry, free-flowing pulverulent solid product of corn syrup made in accordance with the method of claim 4.

References Cited in the file of this patent

UNITED STATES PATENTS 2,818,851     Khym et al. _____ Jan. 7, 1958